United States Patent Office

2,992,214
Patented July 11, 1961

2,992,214
METHOD OF PREPARING CELLULOSE ESTERS
John W. Mench, Brazelton Fulkerson, and Uta K. Schutt, Rochester, N.Y., assignors to Eastman Kodak Company, Rochester, N.Y., a corporation of New Jersey
No Drawing. Filed May 2, 1958, Ser. No. 732,440
5 Claims. (Cl. 260—227)

This invention relates to a method of preparing cellulose esters using organic acid chlorides in which dimethylformamide is employed as the reaction medium.

Acid chlorides have previously been employed to cause the esterification of cellulose. However, in those procedures the reaction has been obtained by the reaction of the acid chloride upon an alkali cellulose or in the presence of a tertiary organic amine such as pyridine. In many of these procedures the cellulose is not converted to a form in which it is readily esterified unless a high temperature and long reaction times are utilized. This condition has been offset by a preliminary treatment of the cellulose such as with aqueous acid or by employment of regenerated cellulose. Any of the various procedures which have been employed heretofore represent extra steps in the preparation of the cellulose ester. In many of the procedures which have been employed heretofore the presence of a material having catalytic properties has been necessary along with the esterifying reagent and the reaction medium.

One object of our invention is to provide a method of preparing cellulose esters employing acid chlorides in which but a single reaction step is necessary. Another object of our invention is to provide a method of preparing cellulose esters by esterifying cellulose with an acid chloride without the necessarity of adding a conventional esterification catalyst. A further object of our invention is to provide a cellulose esterification procedure using dimethylformamide as the solvent therein. Other objects of our invention will appear herein.

We have found that the use of N,N-dimethylformamide as a reaction medium in the esterification of cellulose with an acid chloride eliminates the disadvantages which have been heretofore met with in the esterification of cellulose with acid chlorides. We have found that this procedure is sufficiently effective in the treatment of the cellulose that preliminary treatment is unnecessary, but yet the esters obtained are soluble in the usual solvents for the ester prepared and the intrinsic viscosity thereof is within the normal intrinsic viscosity range of commercial cellulose derivatives. We have found that procedures in accordance with our invention proceed smoothly without the need of pyridine, salts, alkali materials, or any other conventional esterification catalyst.

In its broadest aspects our invention comprises reacting upon cellulose with an organic acid chloride wherein N,N-dimethylformamide is used as the reaction medium therein. If desired, a small amount of an auxiliary solvent may be employed therewith, particularly in the preparation of the cellulose esters of the higher aliphatic acids. Some auxiliary solvents which may be useful are toluene, dioxane, teletrahydrofuran, or in fact any compatible inert solvent, which will not react with the acid chloride or the dimethylformamide. It is desirable that the dimethylformamide constitute at least 50% of the solvent used. The reaction is carried out at a temperature of a least 60° C., and preferably at a temperature as high as 100–125° C. N,N-dimethylformamide is a solvent for many cellulose triesters and thus, in the case of cellulose esters of fatty acids up to and including the n-caproate, the dimethylformamide dissolves the ester at the temperature of esterification used. The presence of some auxiliary solvent is desirable to aid dissolving of the ester when esters higher than the n-caproate are prepared.

The intrinsic viscosity of the ester formed is an indication of the degree of polymerization of the ester prepared. This degree of polymerization is influenced by a number of factors. These include the degree of polymerization of the starting cellulose, the duration and temperature of the reaction, and the amount of dimethylformamide employed. When long reaction times are employed using moderate temperatures, products of high degrees of polymerization are obtained, as is illustrated by Examples 2, 3 and 4 as shown. With the use of greater amounts of dimethylformamide, products of high viscosity are obtained as is illustrated by example 5, in which is shown the phenomena that with even the same amounts of total diluent, but with smaller amounts of dimethylformamide, lower viscosities are obtained.

The preparation of cellulose esters in accordance with our invention may be carried out by the esterification of any esterification grade cellulose such as refined cotton linters and refined high $\alpha$ cellulose wood pulp, or, if desired, less refined types of cellulose may be employed. In the latter case, of course, the products obtained will contain greater amounts of impurities than when the more refined types are employed. Our esterification method is adapted to the preparation of any of the fatty acid esters of cellulose, particularly of those fatty acids having carbon contents of no more than 10 carbon atoms. If desired, mixed esters may be obtained by using mixtures of acid chlorides. The esterification procedures in accordance with our invention are carried out in the absence of any amount of conventional esterification catalyst which would exert any appreciable effect on the esterification. Where the cellulose employed initially is of a lower viscosity type, such as regenerated cellulose, the reaction ordinarily proceeds with greater rapidity to obtain the desired acyl content. However, in most cases the intrinsic viscosity of the product may be less than in those esterification procedures where a higher viscosity cellulose is employed as the starting material.

The following examples illustrate the preparation of cellulose esters in accordance with our invention.

*Example 1*

1 part of regenerated cellulose (regenerated from commercial cellulose acetate) was suspended in 10 parts of N,N-dimethylformamide and was heated to 110° C. while being continuously stirred. 2.57 parts of propionyl chloride (1.5 times the theoretical amount) was slowly added to the mass and it was noted that the cellulose began to dissolve during this addition. At the end of 20 minutes from the time the addition started, the resulting mass was poured into rapidly stirred distilled water whereupon the cellulose propionate obtained precipitated. The product was washed and dried and was found to have an intrinsic viscosity in acetone of 0.26 and a combined propionyl content of 51.3%.

Example 2

1 part of refined cotton linters was stirred into 10 parts of dimethylformamide and 2.57 parts of propionyl chloride was added to the mass. The mass was kept at 60° C. for 31 hours. It was found that the cellulose had dissolved therein and the cellulose propionate formed was separated therefrom after diluting the mass with acetone by pouring into rapidly stirred distilled water. The cellulose propionate obtained had an intrinsic viscosity in acetone of 3.79 and a combined propionyl content of 51.0%.

Example 3

1 part of refined cotton linters was reacted upon by a mixture of 15 parts of dimethylformamide and 2.57 parts of propionyl chloride at 80° C. for 23 hours. The cellulose propionate obtained was separated as described in the preceding example. The product obtained had an intrinsic viscosity in acetone of 1.85 and a combined propionyl content of 51.4%.

Example 4

1 part of refined cotton linters were esterified in a mixture of 10 parts of dimethylformamide and 2.57 parts of propionyl chloride by stirring at 100° C. for 4.25 hours. The cellulose propionate obtained was separated from the mass and the product was found to have an intrinsic viscosity in acetone of 0.91 and a combined propionyl content of 50.7%.

Example 5

The table represents esterification in each case of 1 part of refined cotton linters with 2.57 parts of propionyl chloride at 100° C., the times and amounts of reaction medium indicated, the results obtained being specified in the table.

| Sample | Reaction Time, Hrs. | Parts Used | | Analysis of Product | |
|---|---|---|---|---|---|
| | | Dimethyl-formamide | Dioxane | Intrinsic Viscosity | Percent Combined Propionyl |
| A | 5 | 15 | none | 1.18 | 50.0 |
| B | 4.5 | 10 | none | 0.91 | 50.7 |
| C | 5 | 5 | none | 0.68 | 50.5 |
| D | 7 | 10 | 5 | 0.61 | 49.6 |
| E | 7 | 5 | 10 | 0.27 | 49.6 |

Example 6

1 part of refined cotton linters was esterified in a mixture of 4.7 parts of a dimethylformamide and 2.6 parts (1.18 times the theoretical amount) of n-valeryl chloride, the mass being agitated for 4 hours at 100° C. The reaction mixture was then diluted with acetone and was then poured into rapidly stirred distilled water whereupon the cellulose valerate obtained precipiated. The product obtained was thoroughly washed in water-methanol mixture and was then dried. The dried product had an intrinsic viscosity in acetone of 0.44 and a combined valeryl content of 56.8%.

Example 7

1 part of refined cotton linters was esterified in a mixture of 4 parts of dimethylformamide and 3.3 parts of n-valeryl chloride (1.5 times the theoretical amount) by agitating at 100° C. for 4 hours. There was then added 2.5 parts of dimethylformamide and heating was continued for 20 hours longer. The product was isolated as described in the preceding example and dried. The cellulose valerate had an intrinsic viscosity in acetone of 0.54 and a combined valeryl content of 61.6%.

Example 8

1 part of refined cotton linters was esterified with a mixture of 7 parts of dimethylformamide and 5.32 parts (1.5 times the theoretical amount) of decanoyl chloride by agitating at 100° C. for 24 hours. The cellulose caprate thus obtained was separated from the reaction mass by dilution thereof by toluene and precipitation into methanol. The precipitate was washed with methanol and dried, yet, had an intrinsic viscosity in toluene of 0.31 and a combined capryl content of 69.2%.

Example 9

1 part of cotton linters was soaked in warm water for several hours and the water was removed therefrom by means of 4 changes of acetone. The acetone was replaced by dimethylformamide leaving 7 parts of dimethylformamide on the linters. 5.32 parts of decanoyl chloride was added to this mass and the whole was agitated at 100° C. for 24 hours. The cellulose caprate was isolated from the mass in the manner described in the preceding example. It had an intrinsic viscosity in toluene of 0.33 and a combined capryl content of 71.3%.

Example 10

1 part of refined cotton linters was esterified in a mixture of 2.5 parts of dimethylformamide, 2.5 parts of toluene and 5.32 parts of decanoyl chloride by agitating at 100° C. for 7 hours. The cellulose caprate thus obtained was separated from the mass in the manner described in Example 8. The product thus obtained had an intrinsic viscosity in toluene of 0.22 and a combined capryl content of 73%.

In making esters in accordance with our invention, various other acid chlorides than those listed in the examples may be employed such as acetyl chloride, butyryl chloride, caprylyl chloride or the like. The examples illustrate amounts of chlorides which are usually desirable to form a completely esterified product. There is, however, no limit on the amount of acid chloride which may be employed, if economy is not a consideration. In cases where complete esterification is not necessarily desired, amounts of acid chloride even less than the quantities described in the examples might be employed. The proportions of the materials to be employed to best advantage is within the realm of judgment of the individual operator skilled in the art of preparing cellulose esters.

We claim:

1. A method of preparing a fatty acid ester of cellulose which comprises reacting upon cellulose with a base-free esterification bath essentially consisting of an aliphatic acid chloride and a reaction medium, 50–100% of which medium is dimethylformamide the remainder of the reaction medium being an auxiliary solvent which is non-reactive with the aliphatic acid chloride and the dimethylformamide.

2. A method of preparing cellulose propionate which comprises esterifying cellulose with a base-free esterification bath essentially consisting of propionyl chloride and a reaction medium, 50–100% of which medium is dimethylformamide the remainder of the reaction medium being an auxiliary solvent which is non-reactive with the aliphatic acid chloride and the dimethylformamide.

3. A method of preparing cellulose valerate which comprises reacting upon cellulose with a base-free esterification bath essentially consisting of valeryl chloride and a reaction medium, 50–100% of which medium is dimethylformamide the remainder of the reaction medium being an auxiliary solvent which is non-reactive with the aliphatic acid chloride and the dimethylformamide.

4. A method of preparing cellulose caprate which comprises reacting upon cellulose with a base-free esterification bath essentially consisting of decanoyl chloride and a reaction medium, 50–100% of which medium is dimethylformamide the remainder of the reaction medium being an auxiliary solvent which is non-reactive with the aliphatic acid chloride and the dimethylformamide.

5. A method of preparing a fatty acid ester of cellulose which comprises reacting upon cellulose with a base-free esterification bath essentially consisting of an aliphatic acid chloride and a reaction medium, 50–100% of which medium is dimethylformamide, the remainder of which medium is a solvent for the product and is non-reactive with the other components of the bath.

References Cited in the file of this patent

UNITED STATES PATENTS

| | | |
|---|---|---|
| 1,832,381 | Hagedorn et al. | Nov. 17, 1931 |
| 2,632,007 | Blume et al. | Mar. 17, 1953 |
| 2,831,854 | Tucker et al. | Apr. 22, 1958 |

OTHER REFERENCES

Ott et al.: "Cellulose and Cellulose Derivatives," Interscience Publishers, Inc., New York, Part II (1954), page 765.

Hartman: "J. Chem. Soc.," Pt. 3, pp. 3572–3575, August 1957.